US010425806B2

(12) United States Patent
Singh et al.

(10) Patent No.: US 10,425,806 B2
(45) Date of Patent: *Sep. 24, 2019

(54) AUTOMATIC MULTIMEDIA UPLOAD FOR PUBLISHING DATA AND MULTIMEDIA CONTENT

(71) Applicant: CellSpinSoft Inc., San Jose, CA (US)

(72) Inventors: Gurvinder Singh, Santa Clara, CA (US); Marcos Klein, Mountain View, CA (US); Vince Laviano, Alviso, CA (US)

(73) Assignee: CellspinSoft Inc., San Jose, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 15/659,637

(22) Filed: Jul. 26, 2017

(65) Prior Publication Data
US 2017/0325086 A1 Nov. 9, 2017

Related U.S. Application Data

(63) Continuation of application No. 14/576,202, filed on Dec. 19, 2014, now Pat. No. 9,749,847, which is a
(Continued)

(51) Int. Cl.
G06Q 30/00 (2012.01)
H04W 8/24 (2009.01)
(Continued)

(52) U.S. Cl.
CPC ............ H04W 8/24 (2013.01); G06F 3/0482 (2013.01); G06F 16/958 (2019.01); H04B 7/26 (2013.01);
(Continued)

(58) Field of Classification Search
CPC ....................................... H04W 8/24
See application file for complete search history.

(56) References Cited

U.S. PATENT DOCUMENTS 6,763,247 B1 7/2004 Hollstrom et al.
2003/0157960 A1* 8/2003 Kennedy ............. H04M 1/7253
455/556.1
(Continued)

FOREIGN PATENT DOCUMENTS

JP 2003-51772 A 2/2003
JP 2003-60953 A 2/2003
(Continued)

OTHER PUBLICATIONS

Exhibit A: Forerunner 50 Owners Manual, "http://static.garmin.com/pumac/Forerunner50_OwnersManual.pdf", Nov. 2007, Part No. 190-00839-00 REV. E.
(Continued)

Primary Examiner — Sulaiman Nooristany
(74) Attorney, Agent, or Firm — Ashok Tankha; Lipton, Weinberger & Husick

(57) ABSTRACT

Disclosed herein is a method and system for utilizing a digital data capture device in conjunction with a Bluetooth (BT) enabled mobile device for publishing data and multimedia content on one or more websites automatically or with minimal user intervention. A client application is provided on the BT enabled mobile device. In the absence of inbuilt BT capability, a BT communication device is provided on the digital data capture device. The BT communication device is paired with the BT enabled mobile device to establish a connection. The client application detects capture of data and multimedia content on the digital data capture device and initiates transfer of the captured data, multimedia content, and associated files. The digital data capture device transfers the captured data, multimedia content, and the associated files to the client application. The client application automatically publishes the transferred data and multimedia content on one or more websites.

13 Claims, 5 Drawing Sheets

Related U.S. Application Data continuation of application No. 14/503,401, filed on Oct. 1, 2014, now abandoned, which is a continuation of application No. 14/273,546, filed on May 9, 2014, now Pat. No. 8,862,757, which is a continuation of application No. 14/172,913, filed on Feb. 5, 2014, now Pat. No. 8,798,539, which is a continuation of application No. 13/740,214, filed on Jan. 13, 2013, now Pat. No. 8,700,790, which is a continuation of application No. 12/333,303, filed on Dec. 11, 2008, now Pat. No. 8,392,591.

(60) Provisional application No. 61/017,202, filed on Dec. 28, 2007.

(51) Int. Cl.

| | | |
|---|---|---|
| *G06F 16/958* | (2019.01) | |
| *H04L 29/06* | (2006.01) | |
| *H04L 29/08* | (2006.01) | |
| *H04B 7/26* | (2006.01) | |
| *H04L 7/00* | (2006.01) | |
| *H04L 12/939* | (2013.01) | |
| *G06F 3/0482* | (2013.01) | |
| *H04W 12/04* | (2009.01) | |
| *H04W 4/80* | (2018.01) | |
| *H04W 76/10* | (2018.01) | |
| *H04W 12/00* | (2009.01) | |
| *H04W 84/18* | (2009.01) | |
| *H04W 12/02* | (2009.01) | |

(52) U.S. Cl.
CPC ...... *H04L 7/0008* (2013.01); *H04L 29/06176* (2013.01); *H04L 49/552* (2013.01); *H04L 63/0435* (2013.01); *H04L 63/0492* (2013.01); *H04L 63/083* (2013.01); *H04L 65/403* (2013.01); *H04L 67/02* (2013.01); *H04L 67/06* (2013.01); *H04L 67/10* (2013.01); *H04L 67/1095* (2013.01); *H04W 4/80* (2018.02); *H04W 12/003* (2019.01); *H04W 12/0013* (2019.01); *H04W 12/04* (2013.01); *H04W 76/10* (2018.02); *H04W 12/00502* (2019.01); *H04W 12/02* (2013.01); *H04W 84/18* (2013.01)

(56) References Cited

U.S. PATENT DOCUMENTS

| | | | | |
|---|---|---|---|---|
| 2004/0005915 | A1* | 1/2004 | Hunter | G08B 13/19621 455/575.1 |
| 2009/0096573 | A1* | 4/2009 | Graessley | H04W 12/0802 340/5.8 |

FOREIGN PATENT DOCUMENTS

| | | |
|---|---|---|
| JP | 2003-464841 A | 2/2003 |
| JP | 2003-299014 A | 10/2003 |
| JP | 2004-96166 A | 3/2004 |
| JP | 2004-102810 A | 4/2004 |
| JP | 2005-303511 A | 10/2005 |

OTHER PUBLICATIONS

Exhibit B: Forerunner 50 Quick Start Manual, "http://static.garmin.com/pumac/Forerunner5O_Quickstartmanual.pdf", Nov. 2007, Part No. 190-00839-01 REV. A.

Exhibit C: USB ANT Stick Manual, "https://www.ssbilbehor.se/pub_docs/files/Garmin/Garmin_Forerunner_50_USB_ANT_Stick_instruktioner.pdf", Oct. 2007, Part No. 190-00839-07 REV. B.

Exhibit D: ANT User Guide: "https://www.sparkfun.com/datasheets/Wireless/Nordic/ANT-UserGuide.pdf", D00000652 Rev 2.9, Dynastream Innovations Inc., Jul. 2, 2007.

Exhibit E: D00000652 ANT Message Protocol and Usage Rev 5.1, "https://www.thisisant.com/assets/resources/ANT%20Protocol/D00000652_ANT_Message_Protocol_and_Usage_Rev_5.1.pdf", D00000652 Rev 5.1, Apr. 2014.

Exhibit F: 1293 Foot Pod Quick Reference Guide, "http://static.garmin.com/pumac/1293_FootPodQuickReferenceGuide.pdf", Aug. 2007, Part No. 190-00839-06 Rev. A.

Exhibit A: "Omnibus motion filed by Defendants to dismiss plaintiff's (Cellspin Soft, Inc.) claims", Apr. 3, 2018, pp. (19).

Exhibit B: "Defendants-Appellees' response brief", Aug. 29, 2018, pp. (84).

Exhibit C: "Reply brief of Cellspin", Oct. 3, 2018, pp. (44).

Exhibit D: "Opening brief of Plaintiff-Appellant", Apr. 24, 2019, pp. (85).

Exhibit E: "*Panasoic* vs *Cellspin*—Petition for inter partes review", Oct. 30, 2018, pp. (91).

Exhibit F: "*Canon* vs *Cellspin*—Petition for inter partes review", Oct. 30, 2018, pp. (91).

Exhibit G: "*Panasoic* vs *Cellspin*—Patent owner's preliminary response", Jan. 30, 2019, pp. (51).

Exhibit H: "*Canon* vs *Cellspin*—Patent owner's preliminary response", Jan. 30, 2019, pp. (75).

\* cited by examiner

AUTOMATIC MULTIMEDIA UPLOAD FOR PUBLISHING DATA AND MULTIMEDIA CONTENT

CROSS REFERENCE TO RELATED APPLICATIONS

1. This application is a continuation application of non-provisional patent application Ser. No. 14/576,202, titled "Automatic multimedia upload for publishing multimedia content", filed Dec. 19, 2014 in the United States Patent and Trademark Office, which is a continuation application of non-provisional patent application Ser. No. 14/503,401, titled "Automatic multimedia upload for publishing multimedia content", filed Oct. 1, 2014 in the United States Patent and Trademark Office, which is a continuation application of non-provisional patent application Ser. No. 14/273,546, now U.S. Pat. No. 8,862,757, titled "Automatic multimedia upload for publishing multimedia content", filed May 9, 2014 in the United States Patent and Trademark Office, which is a continuation application of non-provisional patent application Ser. No. 14/172,913, now U.S. Pat. No. 8,798,539, titled "Automatic multimedia upload for publishing multimedia content", filed on Feb. 5, 2014 in the United States Patent and Trademark Office, which is a continuation application of non-provisional patent application Ser. No. 13/740,214, now U.S. Pat. No. 8,700,790, titled "Automatic multimedia upload for publishing multimedia content", filed on Jan. 13, 2013 in the United States Patent and Trademark Office, which is a continuation application of non-provisional patent application Ser. No. 12/333,303, now U.S. Pat. No. 8,392,591, titled "Automatic multimedia upload for publishing multimedia content", filed on Dec. 11, 2008 in the United States Patent and Trademark Office, which claims the benefit of US provisional patent application No. 61/017,202, titled "Automatic multimedia upload for publishing multimedia content", filed on Dec. 8, 2007 in the United States Patent and Trademark Office. The specifications of the above referenced applications are incorporated herein by reference in their entirety.
2. The following patent application is incorporated herein in its entirety: US Non-provisional patent application Ser. No. 11/901,802, titled "Online Publishing Of Multimedia Content", filed on Sep. 19, 2007 in the United States Patent and Trademark Office.

BACKGROUND

This invention, in general, relates to distribution of multimedia content. More particularly, this invention relates to pairing a digital data capture device in conjunction with a mobile device for automatically publishing data and multimedia content on one or more websites simultaneously.

A user may need to capture and publish data and multimedia content on the internet in real time. Typically, the user would capture an image using a digital camera or a video camera, store the image on a memory device of the digital camera, and transfer the image to a computing device such as a personal computer (PC). In order to transfer the image to the PC, the user would transfer the image off-line to the PC, use a cable such as a universal serial bus (USB) or a memory stick and plug the cable into the PC. The user would then manually upload the image onto a website which takes time and may be inconvenient for the user.

Therefore, there is a need for a method and system to utilize a digital data capture device in conjunction with a mobile device for automatically detecting capture of data and multimedia content, transferring the captured data and multimedia content to the mobile device, and publishing the data and multimedia content on one or more websites automatically or with minimal user intervention.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein addresses the above stated need for utilizing a digital data capture device in conjunction with a Bluetooth™ (BT) enabled mobile device for publishing data and multimedia content on one or more websites automatically or with minimal user intervention. The digital data capture device is physically separated from the BT enabled mobile device.

In the method and system disclosed herein, a client application is provided on a BT enabled mobile device. In the absence of in-built BT capability in the digital data capture device, a BT communication device is provided on the digital data capture device. The BT communication device may, for example, be an in-built BT capability chip, a BT memory card, or an external BT device. The BT communication device on the digital data capture device is paired with the BT enabled mobile device to establish a connection between the digital data capture device and the BT enabled mobile device.

A user may capture data and multimedia content using the digital data capture device. The digital data capture device may, for example, be a digital camera, a video camera, or other digital modular camera systems. The client application on the BT enabled mobile device detects the captured data, multimedia content, and files associated with the captured data and the multimedia content on the digital data capture device by communicating over a wireless BT protocol. The captured data, multimedia content, and the associated files are automatically transferred to the client application on the BT enabled mobile device from the digital data capture device.

The detection and transfer of the captured data, the multimedia content, and the associated files may be initiated by the client application of the BT enabled mobile device. The detection and transfer of the captured data, the multimedia content, and the associated files to the BT enabled mobile device may be initiated by the digital data capture device when the client application is unable to detect the captured data, the multimedia content, and the associated files from the digital data capture device.

The user may configure a timer setting and select the websites for publishing using the client application on the BT enabled mobile device. The client application selects the websites for publishing the transferred data and the multimedia content based on user preferences configured on the Bluetooth enabled mobile device. The client application also sets time for publishing the transferred data and the multimedia content automatically or with minimal user intervention. The client application on the BT enabled mobile device automatically publishes the transferred data and multimedia content on one or more websites using the settings configured by the user. The method and system disclosed herein thereby enables the user to capture data and multimedia content, for example, audio, video, text, and images, automatically upload the captured data and multimedia content onto a BT enabled mobile device, and publish the data and multimedia content on one or websites automatically or with minimal user intervention. The user may therefore publish data and the multimedia content on immediate capture of the data and the multimedia content on the digital data capture device.

The method and system disclosed herein is described with reference to a BT communication protocol. The method and system disclosed herein may be realized with wireless protocols, for example, Zigbee® protocol, Wibree™ protocol, Ultra-Wide Band (UWB) protocol, and other wireless protocols for wireless personal area networks.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
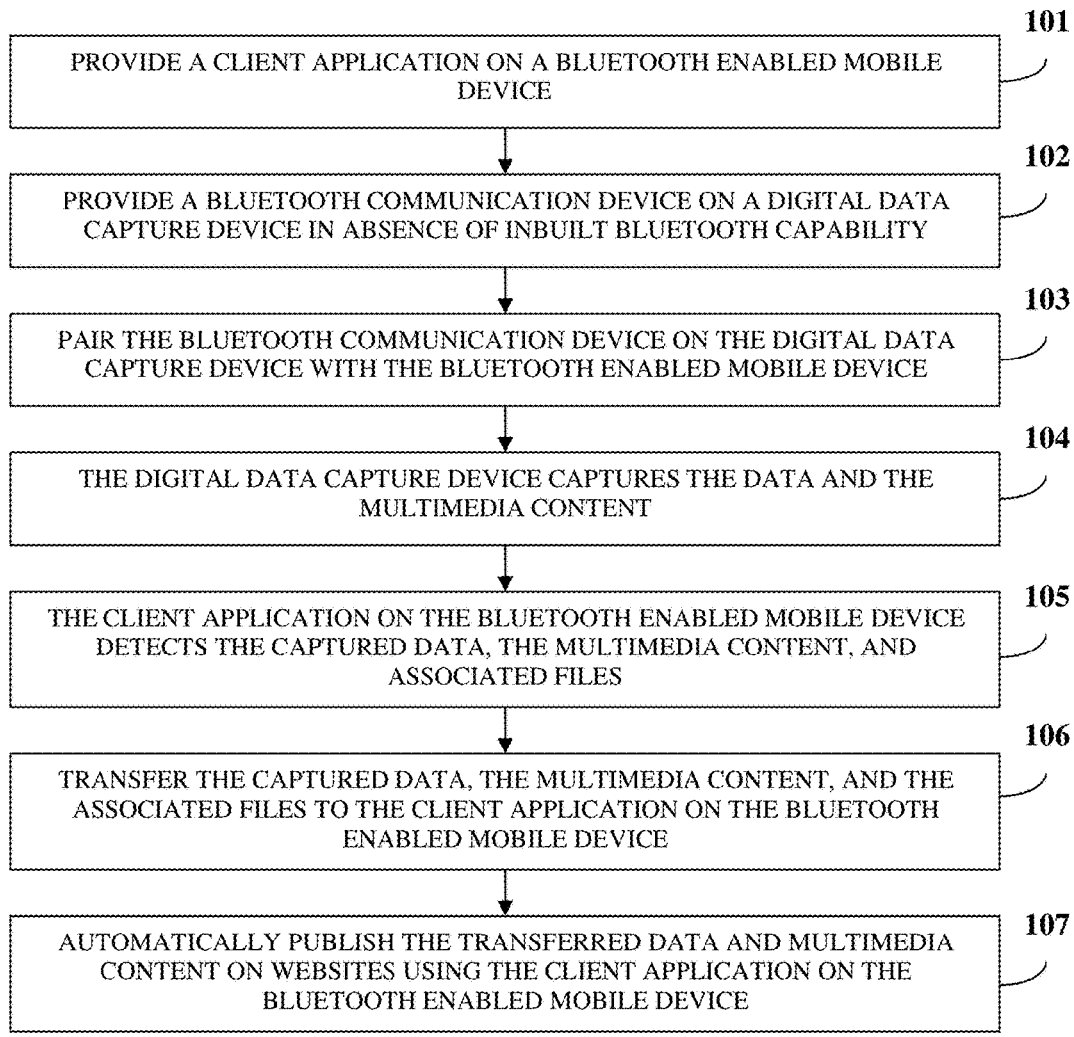
FIG. 1 illustrates a method of utilizing a digital data capture device in conjunction with a Bluetooth enabled mobile device for publishing data and multimedia content on one or more websites automatically or with minimal user intervention.
Figure 2:
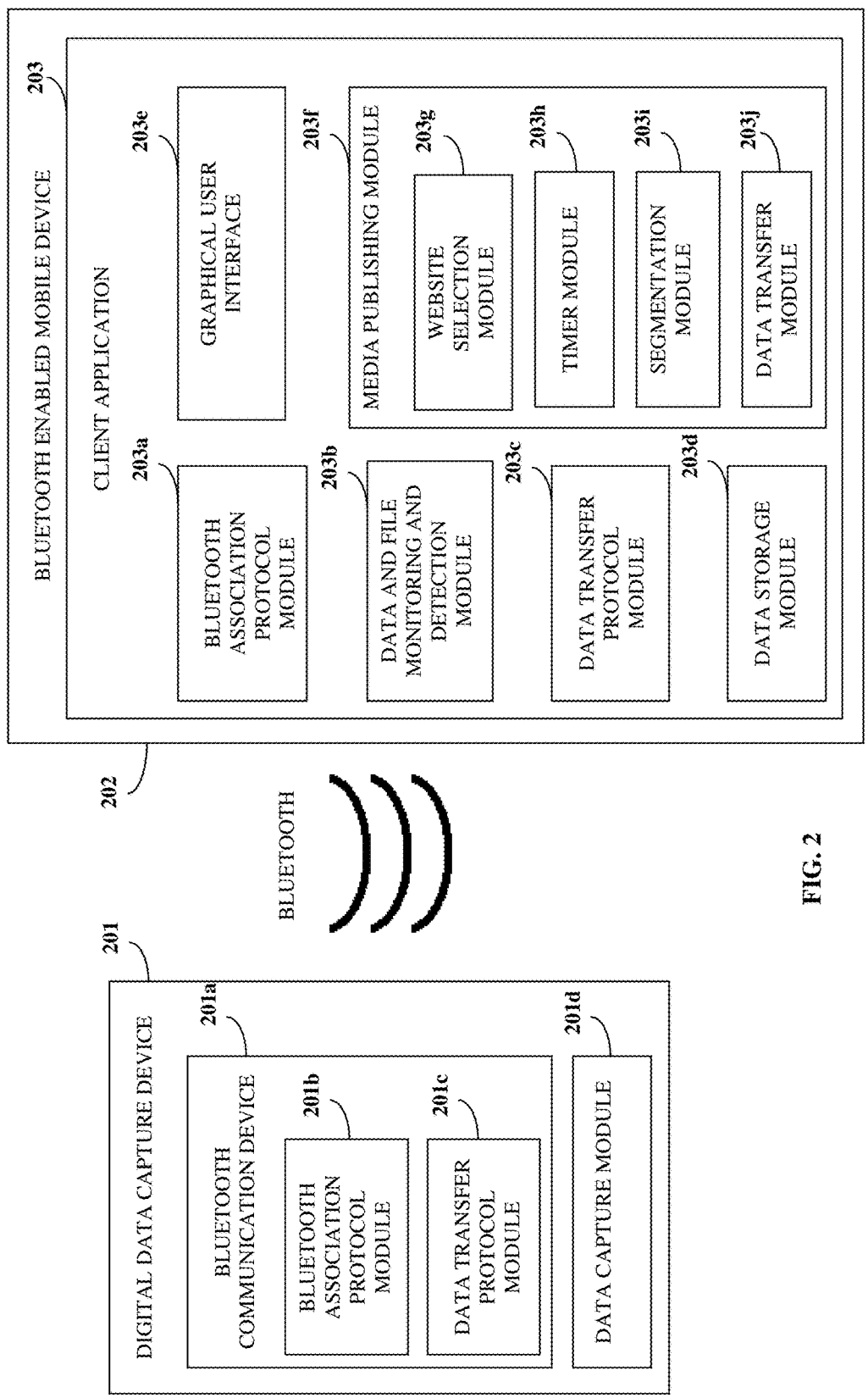
FIG. 2 illustrates a system for utilizing a digital data capture device in conjunction with a Bluetooth enabled mobile device for publishing data and multimedia content on one or more websites automatically or with minimal user intervention.

FIG. 1 illustrates a method of utilizing a digital data capture device 201 in conjunction with a Bluetooth™ enabled mobile device 202 for publishing data and multimedia content on one or more websites automatically or with minimal user intervention. The term "Bluetooth enabled mobile device" is herein referred to as "mobile device". The digital data capture device 201 is physically separated from the mobile device 202 as illustrated in FIG. 2. The digital data capture device 201 may, for example, be a digital camera, a video camera, digital modular camera systems, or other digital data capturing systems.

Figure 3A:
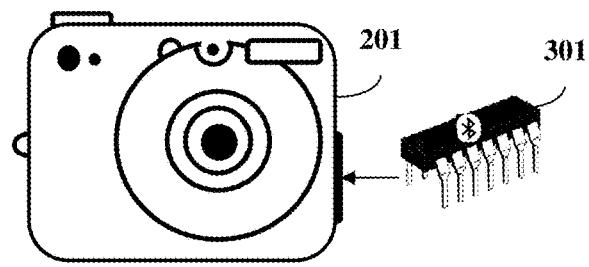
FIGS. 3A-3C exemplarily illustrate the Bluetooth communication device options used on the digital data capture device for establishing a Bluetooth connection with the client application on the Bluetooth enabled mobile device.
Figure 3B:
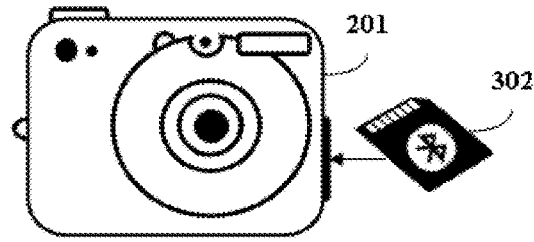
Figure 3C:
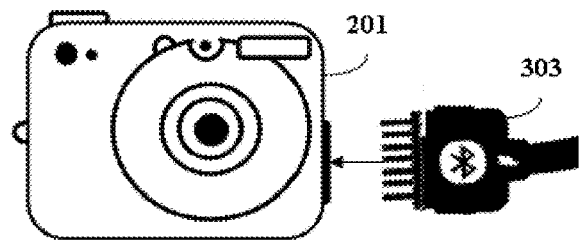

In the method disclosed herein, a client application 203 is provided 101 on the mobile device 202. In the absence of inbuilt Bluetooth (BT) capability in the digital data capture device 201, a BT communication device 201a is provided 102 on the digital data capture device 201. The BT communication device 201a may, for example, be an inbuilt BT capability chip 301, a BT memory card 302, or an external BT device 303 as illustrated in FIGS. 3A-3C respectively. The external BT device 303 may, for example, be attached to a universal serial bus (USB), a firewire interface, or a power port of the digital data capture device 201. BT provides a method of connecting and exchanging information between devices, for example, mobile phones, laptops, personal computers (PCs), printers, digital cameras, etc. over a secure and globally unlicensed short-range radio frequency.

The BT communication device 201a on the digital data capture device 201 is paired 103 with the mobile device 202 to establish a connection between the digital data capture device 201 and the mobile device 202. BT pairing involves establishing a connection between two BT devices that mutually agree to communicate with each other. A BT device that wants to communicate only with a trusted device can cryptographically authenticate the identity of another BT device. BT pairing occurs when the BT communication device 201a agrees to communicate with the mobile device 202 in order to establish a connection. In order to initiate the pairing process between the BT communication device 201a and the mobile device 202, a common password known as a passkey is exchanged between the BT communication device 201a and the mobile device 202. A passkey is a code shared by the BT communication device 201a and the mobile device 202.

A user sets a discoverable mode for the mobile device 202. When set to the discoverable mode, the mobile device 202 will allow the BT communication device 201a on the digital data capture device 201 to detect the mobile device's 202 presence and attempt to establish a connection. In order to initiate the pairing process, the BT communication device 201a will send the BT communication device name of a predefined number of characters, for example, up to 255 characters, and the BT address to the mobile device 202. The BT communication device 201a then prompts the user of the mobile device 202 to enter the passkey code in order to accept the pairing with the BT communication device 201a on the digital data capture device 201. On entering the passkey by the user of the mobile device 202, the entered passkey is matched with the passkey of the BT communication device 201a. If a match is found, a trusted pair is automatically established.

The user captures 104 data and multimedia content using the digital data capture device 201. The data and multimedia content may, for example, comprise image files, audio files, video files, text files, or any combination thereof. The client application 203 on the mobile device 202 detects 105 the captured data, the multimedia content, and files associated with the captured data and the multimedia content. The client application 203 then initiates the transfer of the captured data, the multimedia content, and the associated files in a pull mode of operation. In the pull mode, the client application 203 periodically polls the digital data capture device 201 to determine the creation of a new file in the digital data capture device 201. The digital data capture device 201 then automatically transfers 106 the captured data, the multimedia content, and the associated files to the client application 203 on the mobile device 202 using one or a combination of file transfer protocols. The file transfer protocols may, for example, be one or a combination of BT profile protocols such as the object exchange (OBEX) protocol, the generic object exchange profile (GOEP) protocol, etc. The file transfer protocols may, for example, also be the media transfer protocol (MTP), the picture transfer protocol (PTP), and the PictBridge protocol implemented using a USB.

The picture transfer protocol (PTP) allows the transfer of images from digital cameras to computers and other peripheral devices without the need of additional device drivers. The media transfer protocol is a custom extension to the PTP and allows the protocol to be used for devices other than digital cameras, for example digital audio players and other portable media devices, for example portable video players. The PictBridge protocol allows images to be printed directly from digital cameras to a printer, without having to connect the camera to a computer.

The transfer of the data, the multimedia content, and the associated files may also take place in a push mode of operation. In the push mode, the BT communication device 201a sends a signal to the client application 203 on creation of a new file. By implementation of a handshake protocol, the BT communication device 201a automatically transfers captured data, the multimedia content, and the associated files to the client application 203 on the mobile device 202. For some external digital data capture devices, the client application 203 may not be able to detect the creation of a new file. In such cases, the digital data capture device 201 signals the client application 203 in the event a new file is created. A file event listener in the client application 203 listens for the signal from the digital data capture device 201. The user may then initiate the transfer by a press of a button or a key on the digital data capture device 201.

Figure 4:
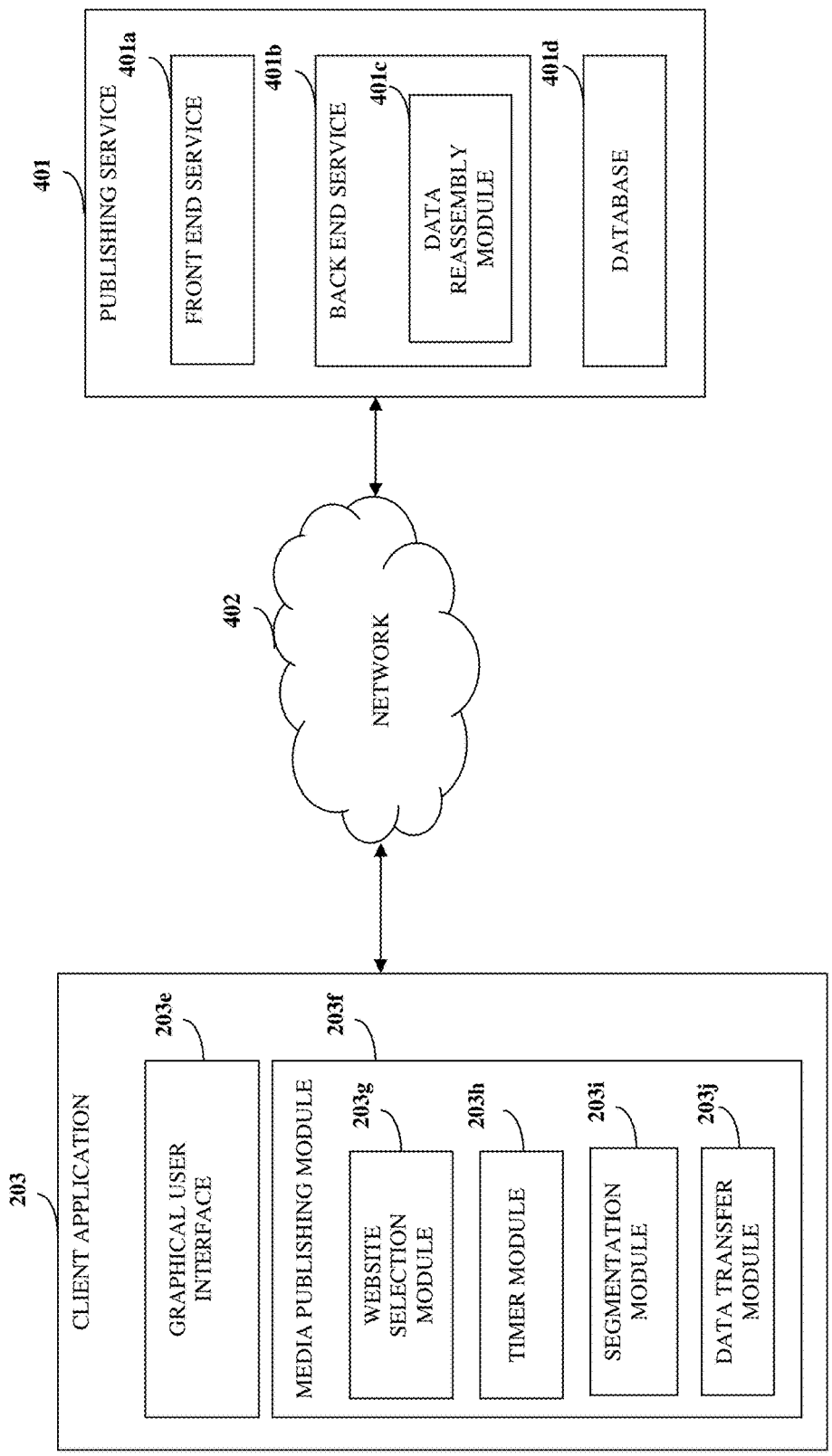
FIG. 4 exemplarily illustrates a system for publishing data and the multimedia content using a client application on a mobile device on one or more websites simultaneously.

In the case of a mobile device 202 with limited memory and processing capabilities, the client application 203 partitions the multimedia content of large files stored on the mobile device 202 into multiple data segments. The data segments are tagged with segment identifiers using the client application 203. The tagged data segments are transferred from the client application 203 of the mobile device 202 to a publishing service 401 via a network 402 as illustrated in FIG. 4.

When the client application 203 is unable to detect the captured data, the multimedia content, and the associated files from the digital data capture device 201, the digital data capture device 201 initiates detection and transfer of the captured data, the multimedia content, and the associated files to the mobile device 202.

The user may also set preferences on the mobile device 202. The user preferences may, for example, comprise the websites selected for publishing the data and the multimedia content. The user may configure a timer setting and the websites on the mobile device 202 for publishing the data and the multimedia content. The user may also set timer and action settings for publishing the data and the multimedia content. The user may set the timer setting to, for example, a "no-wait-automatic" setting, a "wait-X-minutes-automatic" setting, and a "wait-X-minutes-user-input-cancel" setting. The client application 203 on the mobile device 202 selects the websites for publishing the transferred data and the multimedia content based on user preferences configured on the mobile device 202. The client application 203 also sets time for publishing the transferred data and the multimedia content automatically or with minimal user intervention.

The client application 203 on the mobile device 202 then automatically publishes 107 the transferred data and multimedia content on one or more websites. If the user configures the timer setting to "no-wait-automatic", the data and the multimedia content are automatically published on one or more websites based on the user preferences configured on the mobile device 202 without waiting for a certain period of time. If the user configures the timer setting to "wait-X-minutes-automatic", the client application 203 will wait for "X" minutes for the user to change or cancel publishing. If there is no user action for "X" minutes, the client application 203 will automatically publish the data and multimedia content to one or more websites based on the user preferences. Further, if the user configures the timer setting to "wait-X-minutes-user-input-cancel", the client application 203 will wait for "X" minutes for an input from the user. If there is no input from the user, the client application 203 cancels the publishing of the data and multimedia content. The publishing of the data and multimedia content on one or more websites simultaneously is explained in the detailed description of FIG. 4.

The user may therefore capture data, for example, audio, video, text, and images, automatically upload the captured data onto the mobile device 202, and publish the data and multimedia content on one or websites automatically or with minimal user intervention. The method disclosed herein thereby enables the user to publish data and the multimedia content on immediate click of an image or recording of a video on the digital data capture device 201 without having to manually upload the data onto a computing device and then publish the data on the websites.

FIG. 2 illustrates a system for utilizing a digital data capture device 201 in conjunction with a BT enabled mobile device 202 for publishing data and multimedia content on one or more websites automatically or with minimal user intervention. The system disclosed herein comprises a digital data capture device 201 and a client application 203 provided on the BT enabled mobile device 202. The digital data capture device 201 and the mobile device 202 are physically separated from each other. The digital data capture device 201 comprises a BT communication device 201a and a data capture module 201d.

The BT communication device options used on the digital data capture device 201 for establishing a BT connection with the client application 203 on the BT enabled mobile device 202 are exemplarily illustrated in FIGS. 3A-3C. The BT communication device 201a may, for example, be an in-built BT capability chip 301 as illustrated in FIG. 3A, a BT memory card 302 as illustrated in FIG. 3B, or an external BT device 303 as illustrated in FIG. 3C.

The BT communication device 201a comprises a BT association protocol module 201b and a data transfer protocol module 201c. The client application 203 on the mobile device 202 comprises a BT association protocol module 203a, a data and file monitoring and detection module 203b, a data transfer protocol module 203c, a data storage module 203d, a graphical user interface (GUI) 203e, and a media publishing module 203f. The BT association protocol module 201b of the digital data capture device 201 and the BT association protocol module 203a of the client application 203 enable the pairing between the BT communication device 201a and the mobile device 202. The pairing of the BT communication device 201a and the mobile device 202 is explained in the detailed description of FIG. 1. The data capture module 201d captures the data and the multimedia content on the digital data capture device 201.

The data and file monitoring and detection module 203b of the client application 203 monitors and detects the capture of the data, the multimedia content, and the files associated with the captured data and the multimedia content. On detection, the data transfer protocol module 203c of the client application 203 initiates the transfer and download of the captured data, the multimedia content, and the associated files from the digital data capture device 201. When the client application 203 is unable to detect the captured data, the multimedia content, and the associated files from the digital data capture device 201, the data transfer protocol module 201c of the digital data capture device 201 initiates the transfer of the captured data, the multimedia content, and the associated files to the mobile device 202.

The data transfer protocol module 201c of the digital data capture device 201 transfers the captured data, the multimedia content, and the associated files to the client application 203. The data storage module 203d stores the captured data, the multimedia content, and the associated files on the mobile device 202. The user may also set preferences on the mobile device 202 using the GUI 203e of the client application 203. The user preferences may, for example, comprise the websites selected for publishing the data and the multimedia content. The GUI 203e enables the user to configure a timer setting and websites on the mobile device 202 for publishing the data and the multimedia content. The user may also set timer and action settings for publishing the data and the multimedia content using the GUI 203e. The user may set a timer setting, for example, a "no-wait-automatic" setting, a "wait-X-minutes-automatic" setting, and a "wait-X-minutes-user-input-cancel" setting as explained in the detailed description of FIG. 1.

The media publishing module 203f automatically publishes the transferred data and the multimedia content on one or more of the websites. The media publishing module 203f comprises a website selection module 203g, a timer module 203h, a segmentation module 203i, and a data transfer module 203j. The website selection module 203g selects the websites for publishing the data and the multimedia content based on settings and user preferences configured by the user on the mobile device 202. The timer module 203h sets the time for publishing the transferred data and the multimedia content automatically or with minimal user intervention. The timer setting may be set for automatic publishing of the multimedia content or a time based wait mode where user interaction is required. The timer module 203h sets the timer based on a timer setting, for example, a "no-wait-automatic" setting, a "wait-X-minutes-automatic" setting, and a "wait-X-minutes-user-input-cancel" setting configured by the user. The timer module 203h ensures that if the user does not wish to publish the transferred data and multimedia content, the user has time to decide whether to publish or not. The user may also configure the client application 203 to automatically delete the data, the multimedia content, and the associated files after the data and the multimedia content have been posted and published on one or more websites based on user preferences.

In the case of a mobile device 202 with limited memory and processing capabilities, the client application 203 partitions the multimedia content of large files stored on the mobile device 202 into multiple data segments using the segmentation module 203i. The segmentation module 203i generates segment identifiers and tags the data segments with the segment identifiers. The data transfer module 203j transfers the data, the tagged data segments, and the multimedia content from the client application 203 to the publishing service 401 via a network 402 for publishing on the websites automatically.

FIG. 4 exemplarily illustrates a system for publishing data and the multimedia content using a client application 203 on a mobile device 202 on one or more websites simultaneously. The system disclosed herein comprises a client application 203 and a publishing service 401 connected via a network 402. The client application 203 comprises a media publishing module 203f as explained in the detailed description of FIG. 2. The media publishing module 203f comprises the website selection module 203g, the timer module 203h, the segmentation module 203i, and the data transfer module 203j. The website selection module 203g selects the websites based on user preferences configured by the user on the mobile device 202. The timer module 203h sets the time for publishing the transferred data and the multimedia content automatically or with minimal user intervention. The timer module 203h ensures that the publishing service 401 obtains the data, the multimedia content, and the associated files to publish on the selected websites based on the time set by the user.

In the case of limited memory and processing capabilities of the mobile device 202, the segmentation module 203i of the client application 203 partitions the multimedia content of large files into multiple data segments. The segmentation module 203i generates segment identifiers and tags the data segments with the segment identifiers. The segment identifiers may, for example, be one or more of transaction identifiers, sequence numbers, and timestamps. The segment identifiers are used later by a back end service 401b of the publishing service 401 to reassemble the data segments in a predetermined sequence to create a multimedia object. The data transfer module 203j transfers the data, the tagged data segments, and the multimedia content from the client application 203 to the publishing service 401 via the network 402. The network 402 may, for example, be a wireless network, a cellular network, or the internet 501.

The publishing service 401 comprises a front end service 401a, a back end service 401b, and a database 401d. The transferred data and multimedia content is stored in the database 401d of the publishing service 401. A protocol is provided for synchronizing user publishing information between the client application 203 and the publishing service 401. The user publishing information may, for example, comprise user preferences of the websites and the timer setting. The data transfer module 203j may transfer the data and the multimedia content as a single multimedia file, multiple data segments in the case of large files, or electronic mail attachments to the back end service 401b of the publishing service 401 via the front end service 401a. The back end service 401b comprises a data reassembly module 401c. If the back end service 401b receives the multimedia content in the form of multiple data segments, the data reassembly module 401c reassembles the data segments in a predetermined sequence using the segment identifiers. The back end service 401b then creates a multimedia object from the transferred data and multimedia content. The multimedia object is transferred from the back end service 401b to the front end service 401a and then published on the websites selected by the user.

Figure 5:
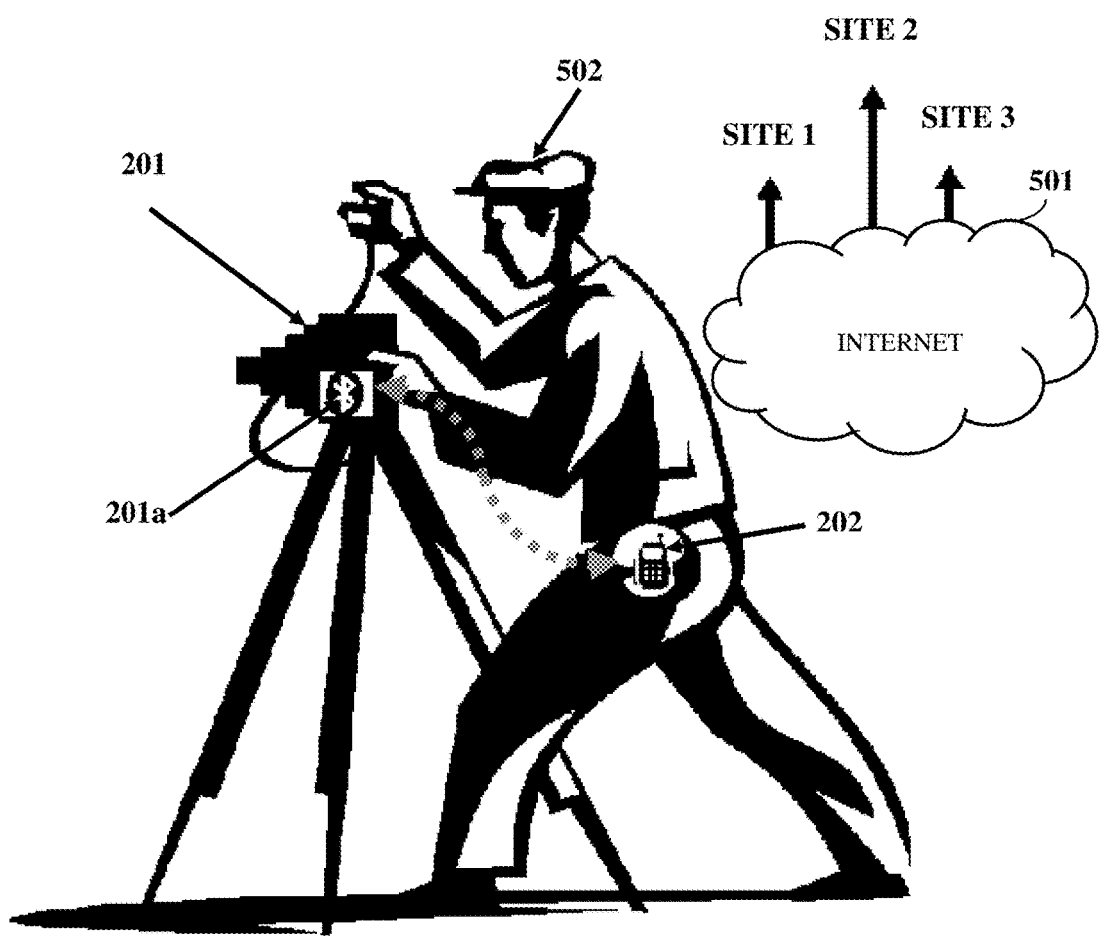
FIG. 5 exemplarily illustrates a user utilizing a digital camera in conjunction with a Bluetooth enabled mobile device for publishing data and multimedia content on one or more websites automatically or with minimal user intervention.

FIG. 5 exemplarily illustrates a user 502 utilizing a digital camera in conjunction with a Bluetooth enabled mobile device 202 for publishing data and multimedia content on one or more websites automatically or with minimal user intervention. The digital camera is physically separated from the mobile device 202 as illustrated in FIG. 5. The digital camera comprises a BT communication device 201a such as an in-built BT capability chip 301, a BT memory card 302, or an external BT device 303 or dongle externally attached to the digital camera as illustrated in FIGS. 3A-3C. The external BT dongle may be attached to a USB, a firewire interface, or a power port of the digital camera. The BT communication device 201a on the digital camera is paired with the mobile device 202 to establish a connection. The user 502 may capture an image using the digital camera. The client application 203 on the mobile device 202 detects the captured image and initiates the transfer of the captured image and the associated files. The digital camera automatically transfers the captured image and the associated files to the client application 203 on the mobile device 202.

The client application 203 automatically publishes the transferred image on one or more websites via the internet 501. The user 502 may set preferences in the mobile device 202. The user preferences, for example, comprise the websites selected for publishing the transferred image. The user 502 may select websites, for example, Flickr™, Picasa™, YouTube™, eBay®, etc. and store the preferences on the mobile device 202. The user 502 may also set the timer setting for publishing the transferred image on the selected websites. After the captured image is transferred to the mobile device 202, the client application 203 publishes the capture image on the selected websites based on the default timer and website settings configured by the user 502 on the mobile device 202.

Consider an example where a user 502 records a video using a BT enabled video camera. The video camera immediately establishes a connection with the user's 502 BT enabled mobile device 202. On detection of the recorded video by the client application 203 on the mobile device 202, the video camera automatically transfers the recorded video to the user's 502 mobile device 202. In the case of limited memory and processing capabilities of the mobile device 202, the recorded video may be streamed as data segments from the mobile device 202 to the publishing service 401. The client application 203 individually tags the data segments with segment identifiers and transfers the tagged data segments from the mobile device 202 to the back end service 401b of the publishing service 401 via the front end service 401a. The back end service 401b of the publishing service 401 reassembles the data segments in a predetermined sequence using the segment identifiers to create the multimedia object. The multimedia object is an aggregation of the reassembled data segments. The multimedia object is then transferred from the back end service 401b to the front end service 401a and automatically published by the front end service 401a on one or more websites selected by the user 502.

Consider another example where a user 502 may record videos or capture images at different points in time and automatically uploads and publishes the videos and images on one or more websites. Consider an investigative reporter, Jane, working for a prominent newspaper in New York City. Each day, she moves around the city chasing leads, interviewing people, videotaping her stories, taking pictures, and tracking down her next big story. When she is working on a story with an associate writer, she may need to upload her videos and pictures and send it immediately to the associate writer. The method and system disclosed herein enables Jane to automatically upload pictures and videos taken using her digital camera or video camera onto a mobile device 202 and publish the pictures, videos, etc. from her mobile device 202 to the internet 501 with one click or touch of a button.

On one click or touch of a button, the pictures and videos are published and immediately made available on Jane's private blog that may be accessed by the newspaper editor and her associates in the news office. When she is collaborating with an associate on a story, they may see each other's progress in real time. Since sharing information with the associate over electronic mails (emails) may be inconvenient, Jane records her progress on the story in the voice format and publishes. The associate may access the information from Jane's blog site, thereby saving considerable time.

Exemplarily, the method and system disclosed herein may be implemented in technologies that are pervasive, flexible, and capable enough of accomplishing the desired tasks of the method and system. The method and system disclosed herein is realized with, but not limited to Bluetooth communication protocol. Wireless protocols, for example, Zigbee® protocol, Wibree™ protocol, Ultra-Wide Band (UWB) protocol, and other wireless protocols for wireless personal area networks may be employed to accomplish the tasks of the method and system disclosed herein. The mobile device 202 may, for example, be a ubiquitous mobile phone. The use of personal digital assistants (PDAs) without telephony support is also fairly widespread. The client application 203 may be deployed on mobile devices with limited or no telephony support. These mobile devices may support Java of Sun Microsystems Inc., more specifically Java 2 Micro Edition (J2ME™), Windows Mobile .Net Compact Framework of Microsoft, Inc., Symbian™, Linux framework. The client application 203 may, for example, be implemented on the J2ME platform. These environments provide functionalities in the libraries to create the GUI 203e and perform all the required functions of the method and system disclosed herein. Other advantages of these frameworks are portability across mobile devices that run on different operating systems.

The client application 203 may be rendered independent of the operating system of the mobile device 202. One of the transport mechanisms to achieve the connectivity between the publishing service 401 and the client application 203 is the wireless internet. While most PDAs have an inbuilt wireless network card for the internet connectivity, the mobile phones may transfer data to the publishing service 401 over the telephony network at near broadband speeds. Some of the mobile phones equipped with both wireless network and telephony data capabilities may use either of the two to communicate with the publishing service 401. The transport protocol that is used between the client application 203 and the publishing service 401 may be hypertext transfer protocol (HTTP) or extensible markup language-remote procedure calls (XML-RPC). The back end service 401b may, for example, be developed in Java.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The program will use various security, encryption and compression techniques to enhance the overall user experience. The software programs may be stored on or in one or more mediums as an object code. A computer program product comprising computer executable instructions embodied in a computer-readable medium comprises computer parsable codes for the implementation of the processes of various embodiments.

Where databases are described such as the database 401*d*, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, Sun® processors, IBM® processors etc., that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A machine-implemented method of media transfer, comprising:

for a digital camera device having a short-range wireless capability to connect with a cellular phone, wherein the cellular phone has access to internet over a cellular data network, performing in the digital camera device:

establishing a short-range paired wireless connection between the digital camera device and the cellular phone, wherein establishing the short-range paired wireless connection comprises, the digital camera device cryptographically authenticating identity of the cellular phone, and wherein establishing the short-range paired wireless connection further comprises the digital camera device using an association protocol;

acquiring new-media, wherein the new-media comprises one or more of video data and image data, and wherein the new-media is acquired after establishing the short-range paired wireless connection between the digital camera device and the cellular phone;

creating a new-media file using the acquired new-media;

storing the created new-media file in a memory of the digital camera device, wherein the established short-range paired wireless connection between the digital camera device and the cellular phone remains paired after storing the created new-media file;

receiving a data transfer request initiated by a mobile software application on the cryptographically authenticated cellular phone, over the established short-range paired wireless connection, wherein the data transfer request is for the new-media file, and wherein the new-media file was created in the digital camera device before receiving the data transfer request; and transferring the new-media file to the cryptographically authenticated short-range wireless enabled cellular phone, over the established short-range paired wireless connection, wherein the mobile software application on the cryptographically authenticated short-range wireless enabled cellular phone is configured to receive the new-media file, wherein the cryptographically authenticated short-range wireless enabled cellular phone is configured to store the received new-media file in a memory of the cryptographically authenticated short-range wireless enabled cellular phone, wherein the established short-range paired wireless connection between the digital camera device and the cellular phone remains paired after storing the received new-media file, wherein the mobile software application on the cryptographically authenticated short-range wireless enabled cellular phone is configured to use HTTP to upload the received new-media file and user information to a user media publishing website over the cellular data network, wherein the user information is stored in the mobile software application on the cryptographically authenticated short-range wireless enabled cellular phone, wherein the user information corresponds to user related information used by the user media publishing website to publish the new-media file, wherein the mobile software application on the cryptographically authenticated short-range wireless enabled cellular phone is further configured to provide a touch based graphical user interface in the cryptographically authenticated short-range wireless enabled cellular phone, wherein the touch based graphical user interface is for the received new-media file, wherein the touch based graphical user interface is configured to receive input to delete the created new-media file, and wherein the touch based graphical user interface is configured to receive input to select a user media publishing website for uploading the received new-media file.

2. The machine implemented method of claim 1, further comprising, performing in the digital camera device:
creating an associated file, wherein the associated file comprises data associated with the new-media;
storing the associated file in the memory of the digital camera device; and
transferring the associated file to the cryptographically authenticated short-range wireless enabled cellular phone, over the established short-range paired wireless connection, wherein the mobile software application on the cryptographically authenticated short-range wireless enabled cellular phone is configured to receive the associated file and store the received associated file in the memory of the cryptographically authenticated short-range wireless enabled cellular phone.

3. The machine-implemented method of claim 1, wherein the short-range paired wireless connection is one of a Bluetooth paired wireless connection, a Wi-Fi paired wireless connection, and other personal area wireless networking technologies that use pairing.

4. A short-range wireless enabled digital camera device, comprising:
a memory;
a processor coupled to said memory;
a short-range wireless communication device configured to control the processor to establish a short-range paired wireless connection between the short-range wireless enabled digital camera device and a short-range wireless enabled cellular phone, wherein establishing the short-range paired wireless connection comprises, the short-range wireless enabled digital camera device cryptographically authenticating identity of the short-range wireless enabled cellular phone, and wherein establishing the short-range paired wireless connection further comprises the short-range wireless enabled digital camera device using an association protocol;
a data capture circuitry;
said processor configured to acquire new-media in the short-range wireless enabled digital camera device using the data capture circuitry, wherein the new-media comprises one or more of video data and image data, and wherein the new-media is acquired after establishing the short-range paired wireless connection between the short-range wireless enabled digital camera device and the short-range wireless enabled cellular phone;
said processor configured to create a new-media file using the acquired new-media;
said processor configured to store the created new-media file in the memory of the short-range wireless enabled digital camera device, wherein the established short-range paired wireless connection between the short-range wireless enabled digital camera device and the short-range wireless enabled cellular phone remains paired after storing the created new-media file;
said processor configured to receive a data transfer request initiated by a mobile software application on the cryptographically authenticated short-range wireless enabled cellular phone, over the established short-range paired wireless connection, wherein the data transfer request is for the new-media file, and wherein the new-media file was created in the short-range wireless enabled digital camera device before receiving the data transfer request; and
said processor configured to transfer the new-media file to the cryptographically authenticated short-range wireless enabled cellular phone, over the established short-range paired wireless connection, wherein the cryptographically authenticated short-range wireless enabled cellular phone comprises a mobile software application that when executed by a processor of the cryptographically authenticated short-range wireless enabled cellular phone is configured to control the processor of the cryptographically authenticated short-range wireless enabled cellular phone to receive the new-media file, store the received new-media file in a memory of the cryptographically authenticated short-range wireless enabled cellular phone, use HTTP to upload the received new-media file and user information to a user media publishing website over the cellular data network, wherein the user information is stored in the mobile software application on the cryptographically authenticated short-range wireless enabled cellular phone, wherein the user information corresponds to user related information used by the user media publishing website to publish the new-media file, and wherein the mobile software application that when executed by the processor of the cryptographically authenticated short-range wireless enabled cellular phone is further configured to provide a touch based graphical user interface, wherein the touch based graphical user interface is for the received new-media file, and wherein the touch based graphical user interface is configured to receive input to select the user media publishing website for uploading the received new-media file.

5. The short-range wireless enabled digital camera device of claim 4, wherein the processor of the short-range wireless enabled digital camera device is further configured to:
create an associated file, wherein the associated file comprises data associated with the new-media;
store the associated file in the memory of the short-range wireless enabled digital camera device; and
transfer the associated file to the cryptographically authenticated short-range wireless enabled cellular phone, over the established short-range paired wireless connection, wherein the mobile software application on the cryptographically authenticated short-range wireless enabled cellular phone that when executed by the processor of the cryptographically authenticated short-range wireless enabled cellular phone is further configured to control the processor of the cryptographically authenticated short-range wireless enabled cellular phone to receive the associated file, store the received associated file in the memory of the cryptographically authenticated short-range wireless enabled cellular phone, and provide a touch based graphical user interface for the received associated file.

6. The short-range wireless enabled digital camera device of claim 4, wherein the short-range paired wireless connection is one of a Bluetooth paired wireless connection, a Wi-Fi paired wireless connection, and other personal area wireless networking technologies that use pairing.

7. A system for transferring media, the system comprising:
a digital camera device, comprising:
a memory;
a processor coupled to the memory;
a short-range wireless communication device configured to establish a short-range paired wireless connection with a cellular phone, wherein the cellular phone has access to internet over a cellular data network, wherein establishing the short-range paired wireless connection comprises, the digital camera device cryptographically authenticating identity of the cellular phone, and wherein establishing the short-range paired wireless connection further comprises the digital camera device using an association protocol;
a data capture circuitry;
said processor configured to acquire new-media in the digital camera device using the data capture circuitry, wherein the new-media comprises one or more of video data and image data, and wherein the new-media is acquired after establishing the short-range paired wireless connection with the cellular phone;
said processor configured to create a new-media file using the acquired new-media;
said processor configured to store the created new-media file in the memory of the digital camera device, wherein the established short-range paired wireless connection between the digital camera device and the cellular phone remains paired after storing the created new-media file;
said processor configured to receive a data transfer request initiated by a software application on the cryptographically authenticated cellular phone, over the established short-range paired wireless connection, wherein the data transfer request is for the new-media file, and wherein the new-media file was created in the digital camera device before receiving the data transfer request; and
said processor configured to transfer the new-media file to the cryptographically authenticated cellular phone, over the established short-range paired wireless connection;
said software application for the cryptographically authenticated cellular phone, wherein the software application is embodied as executable program instructions that when executed by a processor of the cryptographically authenticated cellular phone, is configured to control the processor of the cryptographically authenticated cellular phone to:
send the data transfer request to the digital camera device, over the established short-range paired wireless connection, wherein the data transfer request corresponds to transfer of the new-media file;
receive the new-media file from the digital camera device, over the established short-range paired wireless connection;
store the received new-media file in a memory of the cryptographically authenticated cellular phone, wherein the established short-range paired wireless connection between the digital camera device and the cellular phone remains paired after storing the received new-media file;
provide a touch based graphical user interface for the received new-media file, wherein the touch based graphical user interface is configured to receive input to select a user media publishing website for uploading the received new-media file; and
use HTTP to upload the received new-media file along with user information to the user media publishing website over the cellular data network, wherein the user information corresponds to user related information used by the user media publishing website to publish the new-media file.

8. The system of claim 7, wherein the processor of the digital camera device is further configured to:
create an associated file, wherein the associated file comprises data associated with the new-media;
store the associated file in the memory of the digital camera device; and
transfer the associated file to the cryptographically authenticated cellular phone, over the established short-range paired wireless connection, wherein the software application on the cryptographically authenticated cellular phone that when executed by the processor of the cryptographically authenticated cellular phone is further configured to control the processor of the cryptographically authenticated cellular phone to receive the associated file, store the received associated file in the memory of the cryptographically authenticated cellular phone, and provide a touch based graphical user interface for the received associated file.

9. The system of claim 7, wherein the software application is one of:
stored on a non-transitory computer-readable medium and is installable in the memory of the cryptographically authenticated cellular phone; and
downloadable on to the memory of the cryptographically authenticated cellular phone from a remote server.

10. The system of claim 7, wherein the short-range paired wireless connection is one of a Bluetooth paired wireless connection, a Wi-Fi paired wireless connection, and other personal area wireless networking technologies that use pairing.

11. A non-transitory computer-readable medium containing machine executable instructions that, when executed by a processor on a digital camera device with short-range wireless capability, cause the processor on the digital camera device to perform a method comprising:
acquiring new-media, wherein the new-media comprises one or more of video data and image data, wherein the new-media is acquired after establishing a short-range paired wireless connection between the digital camera device and a cellular phone, wherein establishing the short-range paired wireless connection comprises, the digital camera device cryptographically authenticating identity of the cellular phone, and wherein establishing the short-range paired wireless connection further comprises the digital camera device using an association protocol;
creating a new-media file using the acquired new-media;
storing the created new-media file in a memory of the digital camera device, wherein the established short-range paired wireless connection between the digital camera device and the cellular phone remains paired after storing the created new-media file;

receiving a data transfer request initiated by a software application on the cryptographically authenticated cellular phone, over the established short-range paired wireless connection, wherein the data transfer request is for the new-media file, and wherein the new-media file was created in the digital camera device before receiving the data transfer request; and transferring the new-media file to the cryptographically authenticated cellular phone, over the established short-range paired wireless connection, wherein the mobile software application on the cryptographically authenticated cellular phone is configured to receive the new-media file, wherein the cryptographically authenticated cellular phone is configured to store the received new-media file in a memory of the cryptographically authenticated cellular phone, wherein the established short-range paired wireless connection between the digital camera device and the cellular phone remains paired after storing the received new-media file, wherein the mobile software application on the cryptographically authenticated cellular phone is configured to provide a touch based graphical user interface in the cryptographically authenticated cellular phone, wherein the touch based graphical user interface is for the received new-media file, wherein the touch based graphical user interface is configured to receive input to delete the created new-media file, wherein the touch based graphical user interface is configured to receive input to select a user media publishing website for uploading the received new-media file, wherein the cryptographically authenticated cellular phone is configured to use HTTP to upload the received new-media file and user information to the user media publishing website over a cellular data network, wherein the user information is stored in the mobile software application on the cryptographically authenticated short-range wireless enabled cellular phone, and wherein the user information corresponds to user related information used by the user media publishing website to publish the new-media file.

12. The non-transitory computer-readable medium of claim 11, further comprising executable instructions that when executed by the processor of the digital camera device, cause the processor of the digital camera device to perform:

creating an associated file, wherein the associated file comprises data associated with the new-media;

storing the associated file in the memory of the digital camera device; and transferring the associated file to the cryptographically authenticated cellular phone, over the established short-range paired wireless connection, wherein the mobile software application on the cryptographically authenticated cellular phone is configured to receive the associated file, and store the received associated file in the memory of the cryptographically authenticated cellular phone.

13. The non-transitory computer readable medium of claim 11, wherein the short-range paired wireless connection is one of a Bluetooth paired wireless connection, a Wi-Fi paired wireless connection, and other personal area wireless networking technologies that use pairing.

* * * * *

UNITED STATES PATENT AND TRADEMARK OFFICE
CERTIFICATE OF CORRECTION

PATENT NO. : 10,425,806 B2
APPLICATION NO. : 15/659637
DATED : September 24, 2019
INVENTOR(S) : Singh et al.

Page 1 of 1

It is certified that error appears in the above-identified patent and that said Letters Patent is hereby corrected as shown below:

In the Claims

Column 13, Line 18, cancel the text: "a user media publishing website", and insert the following text: --the user media publishing website--.
Column 14, Line 22, cancel the text: "a mobile software application", and insert the following text: --the mobile software application--.
Column 17, Lines 3-4, cancel the text: "a software application", and insert the following text: --a mobile software application--.

Signed and Sealed this
Fourteenth Day of July, 2020

Andrei Iancu
*Director of the United States Patent and Trademark Office*